United States Patent [19]
Riveron et al.

[11] Patent Number: 5,716,725
[45] Date of Patent: Feb. 10, 1998

[54] METHOD APPARATUS FOR INDICATING IMPROPER COUPLING OF A POWER SOURCE TO AN ELECTRONIC DEVICE

[75] Inventors: Mario A. Riveron, Keller; Lawrence Edward Clements, Arlington, both of Tex.

[73] Assignee: Motorola, Inc., Schaumburg, Ill.

[21] Appl. No.: 660,788

[22] Filed: Jun. 6, 1996

[51] Int. Cl.⁶ ........................................ H01M 10/48
[52] U.S. Cl. .................... 429/1; 429/50; 429/90; 455/349; 455/899
[58] Field of Search ..................... 429/1, 50, 90; 455/349, 899; 436/489, 490

[56] References Cited

U.S. PATENT DOCUMENTS

| | | | |
|---|---|---|---|
| 3,936,121 | 2/1976 | Leinberger | 429/1 X |
| 4,272,142 | 6/1981 | Zapf | 439/490 X |
| 4,969,834 | 11/1990 | Johnson | 439/490 X |
| 4,992,340 | 2/1991 | Tidwell et al. | 429/90 X |
| 5,229,220 | 7/1993 | Stanton et al. | 429/1 |

*Primary Examiner*—Stephen Kalafut
*Attorney, Agent, or Firm*—Pablo Meles

[57] ABSTRACT

An electronic device (100) coupled to a power source (130) having a positive terminal and a negative terminal includes a positive connector (150) for coupling to the positive terminal of the power source (130) and a negative connector (160) for coupling to the negative terminal of the power source (130). An alert circuit (135) coupled to the positive and negative connectors (150, 160) indicates when the power source (130) has been coupled to the electronic device (100) improperly.

19 Claims, 1 Drawing Sheet

METHOD APPARATUS FOR INDICATING IMPROPER COUPLING OF A POWER SOURCE TO AN ELECTRONIC DEVICE

FIELD OF THE INVENTION

This invention relates in general to electronic devices, and more specifically to electronic devices to which power sources can be coupled.

BACKGROUND OF THE INVENTION

Many electronic devices, such as personal messaging units, toys, and other portable devices, include power sources, e.g., batteries, for providing power. In order for a battery powered device to operate, a battery is typically inserted into the device so that the positive terminal couples to a first predetermined connector and the negative terminal couples to a different predetermined connector. However, in many devices, it is possible to insert the battery backwards, in which case the device will not operate properly. If the battery remains improperly inserted for a prolonged period of time, the device can even be damaged.

Thus, what is needed is a method and apparatus for providing an indication that a power source has been improperly coupled to an electronic device.

DESCRIPTION OF A PREFERRED EMBODIMENT

Figure 1:
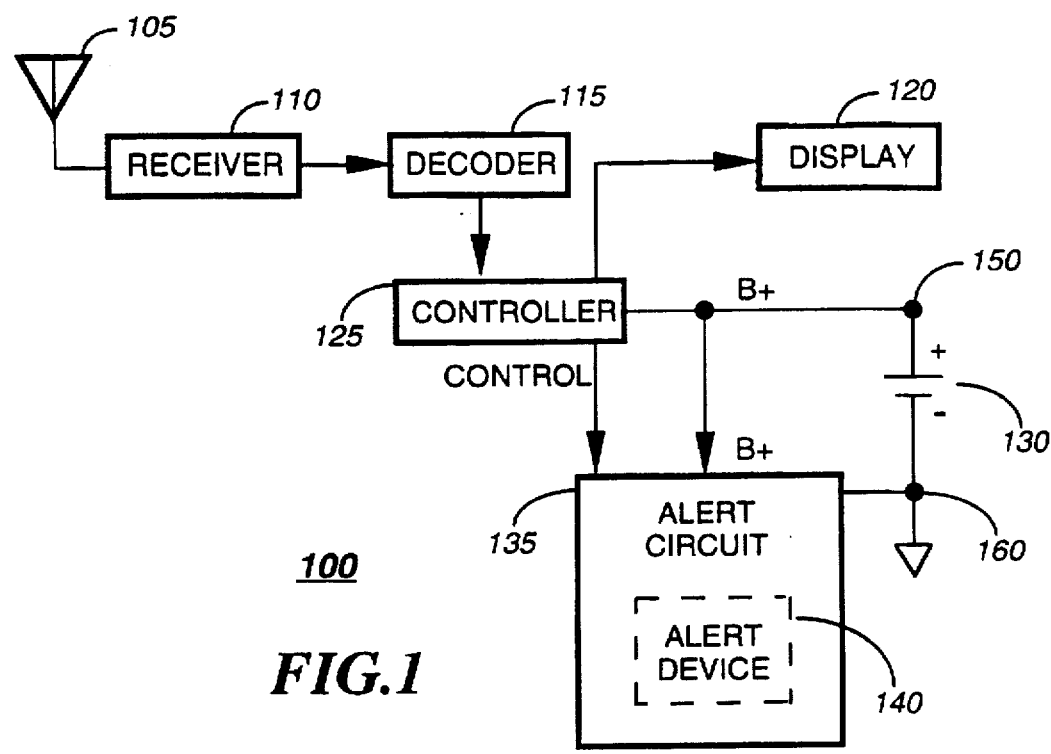
FIG. 1 is an electrical block diagram of an electronic device including a battery in accordance with the present invention.

FIG. 1 is a block diagram of an electronic device 100 that is coupled to a power source 130. The power source 130 can comprise, for instance, a battery for powering the electronic device 100, which may be a communication device, such as a portable messaging unit, a toy, or any other device for coupling to a power source 130. When the electronic device 100 is a communication device, the device 100 includes an antenna 105 for receiving a radio signal, a receiver 110 for demodulating the signal, and a decoder 115 for recovering messages from the demodulated signal. A controller 125 included in the communication device 100 further processes the messages, and a display 120 coupled to the controller 125 presents the messages to a user of the device 100. An alert device 140 is also preferably included in the device 100 for announcing message reception by generating an alert in response to a control signal. The alert device 140 can include, for instance, a light emitting diode (LED) for emitting light or a motor for vibrating responsive to control signals.

According to the present invention, the electronic device 100 includes a positive connector 150 for normally coupling to a positive terminal of the power source 130 to receive a positive voltage, B+. A negative connector 160 is normally grounded by coupling to a negative terminal of the power source 130. It is possible, however, for the power source 130 to be coupled improperly to the electronic device 100. For instance, when the power source 130 is a battery, the battery can be inserted backwards into the device 100 such that the positive battery terminal is coupled to the negative device connector 160 and the negative battery terminal is coupled to the positive device connector 150. In such a situation, the device 100 will not operate correctly. Furthermore, improper battery connection for prolonged periods of time can harm components of the electronic device 100.

In accordance with the present invention, the electronic device also includes an alert circuit 135 coupled to the controller 125 and the power source 130, hereinafter referred to as a battery, for indicating that the battery has been inserted improperly into the device 100. The alert circuit 135 warns the user by activating the alert device 140 to generate an alert, preferably until the user has removed the battery from the device 100. In this manner, the user is advantageously informed of an improperly inserted battery, and the likelihood of damaging the device 100 is minimized.

In prior art devices, on the other hand, the user is not informed by the device that a battery has been inserted incorrectly. Therefore, he may remain unaware of the improper connection until he notices that the device is not operating, by which time the device could be irreparably damaged. The user could then be forced to make expensive repairs or even purchase a new device.

Figure 2:
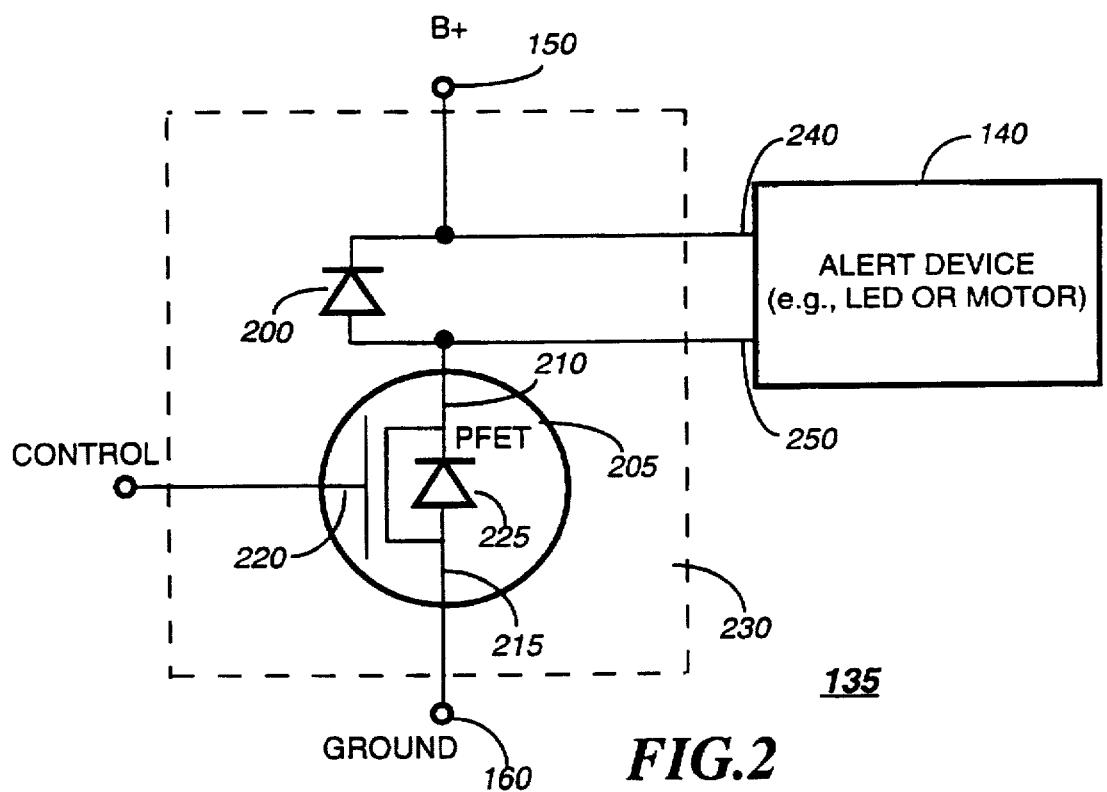
FIG. 2 is an electrical circuit diagram of a driver circuit included in the electronic device of FIG. 1 in accordance with the present invention.

Referring next to FIG. 2, a diagram illustrates a circuit that can be used to implement the alert circuit 135 for announcing an improperly coupled power source according to present invention. The alert circuit 135, as mentioned, includes an alert device 140, such as an LED or vibrating motor, for generating an alert when driven with a voltage. Additionally, a driver circuit 230 is included for activating the alert device 140. The driver circuit 140 can, for instance, comprise a diode 200 having a cathode coupled to the positive connector 150 and to a first port 240 of the alert device 140. An anode of the diode 200 is coupled to a second port 250 of the alert device 140.

The driver circuit 230 further includes a transistor 205, which is preferably a p-channel field effect transistor (PFET). A gate 220 of the transistor 205 is coupled to the controller 125 (FIG. 1) for receiving a control signal therefrom. A drain 210 of the transistor 205 is coupled to the anode of the diode 200 and to the second port 250 of the alert device 140, and a source 215 of the transistor 205 is coupled to the negative connector 160.

Under normal circumstances, when the power source 130 is coupled correctly, B+ is received at the positive connector 150, and ground is received at the negative connector 160. When the transistor 205 comprises a PFET, the control line coupled to the gate 220 is normally held high so that the PFET is turned off. When an active control signal is provided by the controller 125, i.e., when the signal on the control line goes low, current flows from the positive terminal 150 to the negative terminal 160 through the transistor 205, thereby activating the alert device 140. When the signal on the control line is held high by the controller 125, the intrinsic diode 225 of the transistor 205 prevents current flow through the transistor 205 from the positive connector 150 to the negative connector 160. The diode 200 clamps the flyback voltage of the alert device 140 when the transistor 205 is turned off, thereby protecting the transistor 205 from voltage spikes.

When the battery is inserted incorrectly so that B+ is applied to the negative terminal 160 and ground is applied to the positive terminal 150, the intrinsic diode 225 of the transistor 205 permits current flow from the negative terminal 160 to the positive terminal 150, thereby activating the alert device 140 to inform the user of an improperly inserted battery.

It will be appreciated that the clamping diode 200 should be selected to have a high forward voltage drop so that the alert device 140 produces an intense alert. In other words, it is desirable that a motor spin rapidly or that an LED emit a relatively bright light so that the user is immediately aware of the problem. It will also be recognized by one of ordinary skill in the art that the driver circuit 230 is only one of several embodiments that could be used to implement the alert circuit 135. By way of example, the clamping diode 200 could be eliminated in situations in which the transistor 205 needs no protection, such as when the alert device 140 does not generate voltage spikes.

In summary, the electronic device as described above includes connectors for coupling to a power source, such as a battery. When the battery is connected improperly, the electronic device produces an alert. Therefore, the user is advantageously warned of the improper connection and can take steps to correct the problem before the device is damaged. Conventional electronic devices do not include this feature. As a result, improper battery insertion into a conventional electronic device might not be noticed for a prolonged period of time, during which the device might have been damaged.

It will be appreciated by now that there has been provided a method and apparatus for alerting a user to am improperly coupled power source.

What is claimed is:

1. An electronic device for coupling to a power source having a positive terminal and a negative terminal, the electronic device comprising:

a positive connector for coupling to the positive terminal of the power source;

a negative connector for coupling to the negative terminal of the power source;

an alert circuit coupled to the positive and negative connectors for indicating when the power source has been coupled to the electronic device improperly an alert device for generating an alert;

a driver circuit coupled to the alert device for activating the alert device when the power source is coupled to the electronic device improperly; and a controller coupled to the driver circuit for activating the alert device at times other than those when the power source is coupled to the electronic device improperly.

2. The electronic device of claim 1, wherein the power source is improperly coupled to the electronic device when the negative terminal is coupled to the positive connector and when the positive terminal is coupled to the negative connector.

3. The electronic device of claim 1, wherein the alert device comprises a motor for vibrating to generate the alert.

4. The electronic device of claim 1, wherein the alert device comprises a light emitting diode for producing light to generate the alert.

5. The electronic device of claim 1, wherein the controller also activates the alert device at times when the power source is coupled to the electronic device improperly.

6. The electronic device of claim 1, wherein the alert device comprises first and second ports, and wherein the driver circuit comprises:

a transistor having a gate, a source coupled to the negative connector, and a drain coupled to the first port; and a diode having a cathode coupled to the second port and an anode coupled to the first port.

7. The electronic device of claim 6, wherein the transistor comprises a p-channel field effect transistor.

8. The electronic device of claim 6, further comprising:

a controller coupled to the gate of the transistor for providing a control signal in response to which the alert device is activated.

9. A communication device for receiving messages and for coupling to a power source having a positive terminal and a negative terminal, the communication device comprising:

a receiver for receiving the messages;

an alert device coupled to the receiver for announcing reception of the messages;

a positive connector for coupling to the positive terminal of the power source;

a negative connector for coupling to the negative terminal of the power source;

a driver circuit coupled to the positive and negative connectors and the alert device for activating the alert device to generate an alert when the power source has been coupled to the communication device improperly; and a controller coupled to the driver circuit and the receiver for activating the alert device in response to reception of the messages.

10. The communication device of claim 9, wherein the power source is improperly coupled to the communication device when the negative terminal is coupled to the positive connector and when the positive terminal is coupled to the negative connector.

11. The communication device of claim 9, wherein the alert device comprises a motor for vibrating to generate the alert.

12. The communication device of claim 9, wherein the alert device comprises a light emitting diode for producing light to generate the alert.

13. The communication device of claim 9, wherein the alert device comprises first and second ports, and wherein the driver circuit comprises:

a transistor having a gate, a source coupled to the negative connector, and a drain coupled to the first port; and a diode having a cathode coupled to the second port and an anode coupled to the first port.

14. The communication device of claim 13, wherein the transistor comprises a p-channel field effect transistor.

15. The communication device of claim 13, further comprising:

a controller coupled to the gate of the transistor for providing a control signal in response to which the alert device is activated.

16. A method, in a communication device for receiving messages having an alert device and coupled to a power source having positive and negative terminals, for providing an alert, the method comprising the steps of:

determining whether the power source is improperly coupled to the electronic device;

activating the alert device to generate the alert in response to the determining step determining that the power source is improperly coupled to the communication device; and activating the alert device to generate the alert in response to the reception of messages by the communication device.

17. The method of claim 16, wherein the determining step comprises the steps of:

determining that the positive terminal of the power source is connected to a negative connector of the electronic device; and determining that the negative terminal of the power source is connected to a positive connector of the electronic device.

18. The method of claim 16, wherein the activating step comprises the step of:
activating a light emitting diode to emit light.

19. The method of claim 16, wherein the activating step comprises the step of:
activating a motor to vibrate.

* * * * *